United States Patent
Heinrich et al.

(10) Patent No.: US 10,293,746 B2
(45) Date of Patent: May 21, 2019

(54) METHOD FOR OPERATING AN INTERIOR LIGHTING DEVICE FOR A MOTOR VEHICLE, INTERIOR LIGHTING DEVICE FOR A MOTOR VEHICLE AND MOTOR VEHICLE

(71) Applicant: HELLA KGaA Hueck & Co., Lippstadt (DE)

(72) Inventors: Jürgen Heinrich, Kirchzarten (DE); David Allouis, Bad Iburg (DE); Stefan Kowatzki, Stammham (DE); Wolfgang Wörmann, Ilmmünster (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 55 days.

(21) Appl. No.: 15/396,966

(22) Filed: Jan. 3, 2017

(65) Prior Publication Data

US 2018/0186285 A1 Jul. 5, 2018

(51) Int. Cl.
*B60Q 3/20* (2017.01)
*H05B 37/02* (2006.01)
*H05B 33/08* (2006.01)
*G01J 1/00* (2006.01)

(52) U.S. Cl.
CPC ............... *B60Q 3/20* (2017.02); *G01J 1/00* (2013.01); *H05B 37/0227* (2013.01)

(58) Field of Classification Search
None
See application file for complete search history.

(56) References Cited

U.S. PATENT DOCUMENTS

| | | | | |
|---|---|---|---|---|
| 7,952,292 | B2 * | 5/2011 | Vegter | H05B 37/02 315/149 |
| 8,098,157 | B2 * | 1/2012 | Saunders | G08B 15/00 340/541 |
| 9,839,098 | B2 * | 12/2017 | Salter | H05B 37/0227 |
| 2006/0044800 | A1 * | 3/2006 | Reime | H05B 33/0803 362/276 |
| 2008/0087797 | A1 * | 4/2008 | Turnbull | B60R 1/12 250/206.1 |
| 2010/0073461 | A1 * | 3/2010 | Hammes | G01B 11/2545 348/42 |

(Continued)

FOREIGN PATENT DOCUMENTS

| | | |
|---|---|---|
| DE | 298 22 554 U1 | 3/1999 |
| DE | 102 51 133 B3 | 7/2004 |

(Continued)

*Primary Examiner* — Crystal L Hammond
(74) *Attorney, Agent, or Firm* — Paul D. Strain, Esq.; Strain & Strain PLLC

(57) ABSTRACT

Method for operating an interior lighting device for a motor vehicle, comprising a lighting device and a sensor device, which senses a position of an operator control object for the lighting device in its sensing area, wherein the lighting device is controlled on the basis of sensor data from the sensor device, wherein the lighting device has multiple actuatable lighting units that each have an associated local section defined in the sensing area, wherein when an operator control object is detected in a local section, the associated lighting unit is activated and activated lighting units not associated with the local section are deactivated.

16 Claims, 5 Drawing Sheets

(56) References Cited

U.S. PATENT DOCUMENTS

| | | | |
|---|---|---|---|
| 2010/0296285 A1* | 11/2010 | Chemel | F21S 2/005 |
| | | | 362/235 |
| 2011/0241544 A1* | 10/2011 | Murray | B60Q 1/323 |
| | | | 315/77 |
| 2012/0112633 A1* | 5/2012 | Lee | H01J 61/56 |
| | | | 315/32 |
| 2013/0113397 A1* | 5/2013 | Salter | F21V 23/04 |
| | | | 315/362 |
| 2013/0229518 A1* | 9/2013 | Reed | H05B 37/0227 |
| | | | 348/148 |
| 2014/0354179 A1* | 12/2014 | Newton | H05B 37/0227 |
| | | | 315/297 |
| 2017/0147074 A1* | 5/2017 | Buttolo | G06F 3/017 |
| 2017/0332458 A1* | 11/2017 | Salter | F21S 43/13 |
| 2018/0086258 A1* | 3/2018 | Fleurence | B60Q 3/80 |

FOREIGN PATENT DOCUMENTS

| | | |
|---|---|---|
| DE | 10 2006 027 549 A1 | 12/2007 |
| DE | 10 2011 122 180 A1 | 9/2012 |
| DE | 10 2012 015 039 A1 | 1/2014 |
| DE | 10 2012 017 276 A1 | 3/2014 |

\* cited by examiner

METHOD FOR OPERATING AN INTERIOR LIGHTING DEVICE FOR A MOTOR VEHICLE, INTERIOR LIGHTING DEVICE FOR A MOTOR VEHICLE AND MOTOR VEHICLE

The invention relates to a method for operating an interior lighting device for a motor vehicle, comprising a lighting device and a sensor device that senses a position of an operator control object for the lighting device in its sensing area, wherein the lighting device is controlled on the basis of sensor data from the sensor device. In addition, the invention relates to an interior lighting device for a motor vehicle and to a motor vehicle.

For the purpose of illuminating an interior of a motor vehicle, mechanical—what are known as Cardan—interior lighting devices are known in which the lighting device is mounted by a crosswise-arranged two-axis system or a spherical rotary mechanism in order to alter the direction of radiation of the lighting device manually. A complex mechanical design of this kind is extremely costly, however, and takes up a large installation space and a great physical depth when arranged in the roof lining of the motor vehicle. Furthermore, the free movement of manual directional adjustment of this kind can be correctly regulated only with difficulty, and particular disadvantages with regard to wear, noise generation and occupant safety as a result of protruding mechanical elements have manifested themselves.

In addition, purely electronic interior lighting devices are known. These typically have a lighting device that radiates light at a wide angle for the purpose of illuminating large areas of the interior or in a focused manner, for example as a reading light. More recently, there have also been proposals to provide not only a lighting device but also a sensor device that is used to sense the position of an operator control object, particularly a finger of a user, and to actuate the lighting device on the basis of sensor data describing the position of the operator control object.

DE 10 2011 122 180 A1 describes a method for identifying an operating movement for sensor-controlled activation of a motor vehicle equipment element by means of an operating apparatus that has capacitive sensors with overlapping sensing areas. To this end, a total duration of a sensed movement through the sensing areas and an overlap duration for the movement in an area of overlap are sensed, after which a quotient of the overlap duration and the total duration is computed and compared with a limiting value that separates valid directions of movement from invalid directions of movement. The equipment element may particularly be a lighting apparatus.

Interior lighting devices based on sensor devices have furthermore to date only had the possibility of the lighting device being activated on the basis of an operator control gesture performed in one particular direction.

The invention is therefore based on the object of specifying a more flexible possibility for illuminating an interior of a motor vehicle by means of an interior lighting device.

This object is achieved by providing, according to the invention, that the lighting device has multiple actuatable lighting units that each have an associated local section defined in the sensing area, wherein when an operator control object is detected in a local section, the associated lighting unit is activated and activated lighting units not associated with the local section are deactivated.

The invention is based on the consideration of using suitable division of the sensing area of the interior lighting device for a motor vehicle into defined local sections to allow actuation of a lighting device that, when the operator control object is moved in the manner of a gesture, allows the light distribution to be altered in the manner similar to a mechanically adjustable interior lighting device. To this end, the lighting device has multiple lighting units that each have an associated local section of the sensing area. A local section is therefore a three-dimensional part of the sensing area, multiple lighting units naturally also being able to be associated with the same local section. According to the invention, there is provision for the sensor device to initially sense a position of the operator control object, particularly a finger, in a local section and to activate the lighting unit associated with the local section. At the same time, lighting units not associated with the local section are deactivated. If the operator control object is located in multiple, in particular overlapping, local sections at the same time, then naturally all lighting units associated with these local sections are activated. In this case, the sensor data from the sensor device are evaluated, and the lighting units are actuated, preferably by means of a control device of the interior lighting device or of the motor vehicle in which the interior lighting device is installed.

The method according to the invention advantageously allows the activation of the lighting units to follow the momentary position of the operator control object, so that gesture control of the interior lighting device is realized. This does not initially involve a movement profile of the operator control object in the sensing area being sensed and evaluated, after which a predefined activation sequence for the lighting units is acted out. Rather, the lighting units are actuated instantaneously on the basis of a momentary position of the operator control object in the local sections of the sensing area. A user altering the position of the operator control object is therefore given the impression that he is moving the whole lighting device as in the case of a mechanically suspended Cardan interior lighting device. With particular advantage, this results in intuitively comprehensible gesture control. If the operator control object is routed through multiple local sections in a swinging movement, for example, then a sequence of briefly activated lighting units that corresponds to this movement, which is also known as swiping, is obtained, with the most recently activated lighting unit remaining in the activated state. Furthermore, by introducing the operator control object into a local section and subsequently removing the operator control object from this local section, hence by means of a tapping movement, it is possible for only the at least one lighting unit linked to the relevant local section to be activated. The method according to the invention allows the interior lighting device to be operated in a multiplicity of additional lighting states beyond the whole lighting device being simply switched on and off, and therefore provides a user with substantially increased flexibility. In addition, it is possible to avoid a mechanically sophisticated and fault-prone Cardan suspension for the lighting device.

As already described, local sections of the sensing area can intersect one another, but it is particularly preferred if disjunctively defined local sections are used. This allows a user to associate positions of the operator control object for the respective reaction from a lighting unit in an intuitively clear manner. In this case, it is particularly necessary to bear in mind that, in comparison with conventional interior lighting devices mentioned at the outset, an area of overlap for individual local sections does not necessarily have to be provided to identify a valid operator control gesture. It is furthermore also conceivable that, when the operator control object is located in multiple local sections at the same time on account of its extent, the position of the operator control object is associated with only one local section.

Furthermore, particular preference for the method according to the invention is when multiple positions of the operator control object that form a position trace are sensed in succession, after which the sensed position trace is taken as a basis for performing a stipulated control action. Therefore, in addition to the instantaneous activation and deactivation of lighting units on the basis of the position of the operator control object, it is possible to define position traces, hence particular movement gestures, that are a trigger signal for a stipulated control action. With particular advantage, it is thus possible to implement additional functionalities of the interior lighting device. Expediently, the position traces to be sensed differ sufficiently from intuitively clear movements that are intended to be used to instantaneously actuate the lighting units.

In this case, it is particularly preferred when a control action initiating activation of all lighting units and/or a control action initiating deactivation of all lighting units is used. By way of example, there may be provision that, when all or a stipulated sequence of the local sections are swept over, complete activation of all lighting units is initiated and, on a repetition, all lighting units are deactivated. In this respect, there may also be provision for the stipulated control action to be additionally performed on the basis of a current operating state of the lighting device.

Finally, within the context of the method according to the invention, it is of particular advantage when the lighting units are activated and/or deactivated in accordance with a stipulated or stipulable brightness time profile. It is therefore proposed that the lighting units are not switched on or off abruptly but rather that a brightness profile is stipulated or ascertained that extends over a longer period than the respective lighting unit needs for achieving its target brightness when switched on or off suddenly. In the simplest case, it is conceivable, by way of example, to stipulate a ramp-shaped brightness time profile. However, it is preferred when the brightness profile is describable by a constant function with an inflection point. Alternatively, it is also possible to use a time profile of sensor data describing the position of the operator control object in the local section or a variable derived therefrom that has undergone smoothing, for example by low pass filtering, as a brightness time profile. Similarly, the brightness time profile can be ascertained on the basis of further parameters, for example an additionally sensed speed of movement of the operator control object. In this case, a stipulated or stipulable brightness time profile allows soft activation and deactivation of the lighting units or a smooth-action changeover between the lighting units, reinforcing an impression corresponding to that of a rotatably mounted Cardan interior lighting device.

In addition, the invention relates to an interior lighting device for a motor vehicle, comprising a lighting device, a sensor device, which is designed for sensing a position of an operator control object for the lighting device in its sensing area, and a control device, which is designed for controlling the lighting device on the basis of sensor data from the sensor device, wherein the lighting device has multiple actuatable lighting units that each have an associated local section defined in the sensing area, wherein the control device is designed to perform the method according to the invention. The lighting units may particularly be incandescent lamps, including halogen incandescent lamps and gas discharge lamps, or light emitting diodes. Naturally, it is also conceivable for a lighting unit to be formed from multiple instances of the aforementioned illuminant forms, particularly an array. Further, it is particularly preferred when the sensor device comprises at least one proximity sensor, with capacitive proximity sensors preferably being used.

In the case of the interior lighting device according to the invention, it is particularly preferred when the lighting units have different radiation angles and/or illumination areas. The lighting units can therefore have their respective main direction of radiation oriented differently in respect of one another and/or arranged in staggered fashion in respect of one another. Specifically when there is a change of position for the operator control object through multiple local sections, this particularly effectively produces an impression of a beam of light following the operator control object, as conveyed by a continuously shining, mechanically rotatably mounted lighting device. Furthermore, by activating a multiplicity of or all lighting units, it is thus also possible to produce an interior light radiating at a wide angle, or when only one lighting unit or a small number of lighting units is or are activated in comparison with the total number thereof, to produce a single focused beam of light ("spot"). Naturally, it is also conceivable in this case that, when multiple lighting units are activated at the same time, they are not operated at their greatest possible actuatable brightness, but rather are dimmable to stipulated or stipulable low brightness levels.

It is moreover particularly expedient for the interior lighting device according to the invention when the sensor device is arranged physically adjacently to the lighting device. In particular, the sensor device may be arranged relative to the lighting device such that positions of the operator control object in direct proximity to the lighting device can be sensed. In this case, it is preferred when the interior lighting device is in the form of a single integral physical unit. In this way, a particularly compact embodiment of the interior lighting device can be realized, which advantageously opens up additional degrees of design freedom for the interior of the motor vehicle accommodating the interior lighting device. It is further preferred when the lighting units are accommodated in a housing of the lighting device that ends with a transparent cover through which the light from the lighting units can radiate.

With particular advantage, the interior lighting device according to the invention may further have provision for the sensor device to have multiple sensor units, wherein individual sensing areas of the sensor units form the sensing area. The sensor units may in this case be in the form of separate single sensors or be functional divisions of a signal sensor. In this context, in the simplest case, each individual sensing area of a sensor unit can define a local section in the sensing area of the sensor device. However, it is preferred when sensor data from all sensor units are used by the sensor device to ascertain a piece of position information describing the position of the operator control object, which piece of position information is assigned to a local area that is accordingly defined in the space defined by possible values of the piece of position information.

For the interior lighting device having multiple sensor units, it is particularly preferred in this case when at least two lighting units and at least two sensor units are arranged in alignment. This allows a straight swipe gesture in the direction of alignment to prompt the at least two lighting units to be activated and deactivated in succession, but with the lighting unit that is activated last remaining in an activated state. Accordingly, multiple groups of at least two lighting units and at least two sensor units may be arranged in alignment, with preferably a centrally arranged lighting unit being provided that belongs to several of these groups.

Finally, it is particularly expedient for the interior lighting device according to the invention when at least one display element connected to the control device and associated with at least one lighting unit is provided that is actuatable for the purpose of displaying the at least one activated lighting unit. A display element of this kind may be, by way of example, a light emitting diode arranged adjacently to the lighting device, the brightness of the display element usefully being much lower than the greatest possible actuatable brightness of a respective lighting unit. A user is thus provided with an additional piece of information about what lighting units are momentarily activated, it being preferred for a respective display element to be activated only when the associated lighting unit is still activated after a stipulated waiting time following its activation. Particularly preferably, the at least one display element has a smaller size and/or a lower light output and/or a different color than the lighting units.

In addition, the invention relates to a motor vehicle, comprising at least one interior lighting device. The interior lighting device is in this case preferably arranged in a roof lining of the motor vehicle and set up to light a passenger compartment of the motor vehicle.

All of the explanations relating to the method according to the invention can be transferred analogously to the interior lighting device according to the invention and the motor vehicle according to the invention, so that the advantages already cited can also be attained with these. Similarly, all of the explanations relating to the interior lighting device according to the invention are transferable to the method according to the invention, it being possible for the interior lighting according to the invention, including its individual components with their properties described, to be used for the purposes of the method of the invention.

Further advantages and details of the invention will emerge from the exemplary embodiments described below and from the drawings, in which:

FIG. 1 shows a front view of a first exemplary embodiment of an interior lighting device according to the invention;

FIG. 2A to 2C each show a perspective view of the interior lighting device shown in FIG. 1 in different operator control situations;

FIG. 3A to 3C each show a schematic representation of the actuation of a lighting device of the interior lighting device shown in FIG. 1 during the operator control situations shown in FIG. 2A to 2C;

Figure 1:
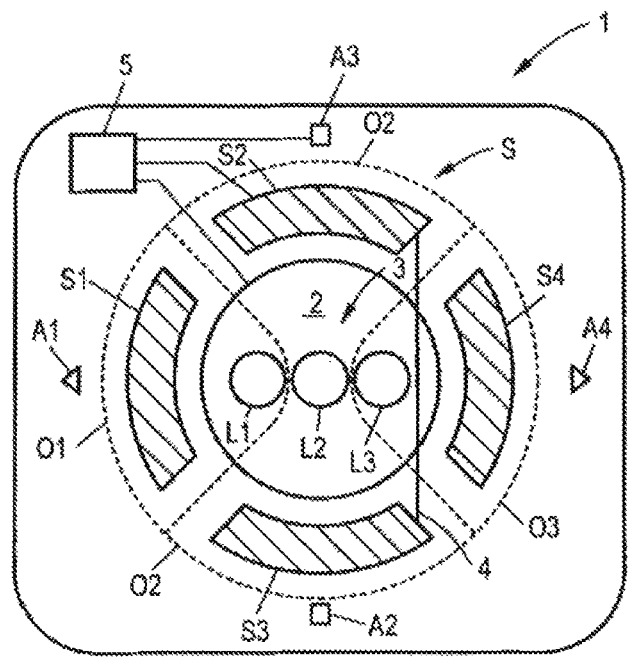
FIGS. 1, 2A, 2B and 2C show a first exemplary embodiment of an interior lighting device 1, comprising a lighting device L, having three lighting units L1 to L3, and a sensor device S having four sensor units S1 to S4.

FIG. 1 shows a front view of the interior lighting device 1. The lighting device L comprises a housing 2 in which the lighting devices L1 to L3 are accommodated and arranged in alignment. Each lighting unit L1 to L3 is in the form of a light emitting diode and has an optical focusing device, for example a lens or a reflector, so that it radiates light at an acute apex angle at different radiation angles. Alternatively, it is also conceivable for the lighting units L1 to L3 to be realized as an incandescent lamp, for example as a conventional filament incandescent lamp, halogen incandescent lamp or gas discharge lamp, or as an array of light emitting diodes or incandescent lamps. The front of the housing 2 ends with a transparent plate 3 that the light from the lighting units L1 to L3 can penetrate.

The sensor device S comprises a sensing area that is formed from individual sensing areas of the sensor units S1 to S4. In the sensing area, three local sections O1 to O3 are defined, to which the sensor device 5 assigns a position ascertained in the sensor area for an object, to which end sensor data from all sensor units S1 to S4 are evaluated collectively. In particular, the local area O2 is formed by providing a coupling 4 between the sensor units S2, S3. The lighting unit L1 has the associated local section O1, the lighting unit L2 has the associated local section O2 and the lighting unit L3 has the associated local section O3 in this case. As can be seen, the sensor units S1 to S4 are arranged physically adjacently to the lighting device, surrounding a front opening of the housing 3 in the circumferential direction. The sensor devices S1 to S4 do not themselves need to be visible to a user in this case, however, but it is advantageous if they are perceptible by touch to the user as a result of a suitable front surface contour or trough-like surface of the interior lighting device 1.

The interior lighting device 1 further has four display elements A1 to A4 that are used to display activated lighting devices L1 to L3.

Finally, the interior lighting device 1 comprises a control device 5 that is connected to the sensor device S, symbolized by a connection to the sensor unit 2, to the lighting unit L and to the display elements A1 to A4, symbolized by a connection to the display element A3. The control device 5 is designed to control the lighting device L on the basis of sensor data from the sensor device S, the control device 5 rendering the lighting units L1 to L3 activatable and deactivatable and additionally actuatable for the purpose of altering their brightness.

Figure 2A:
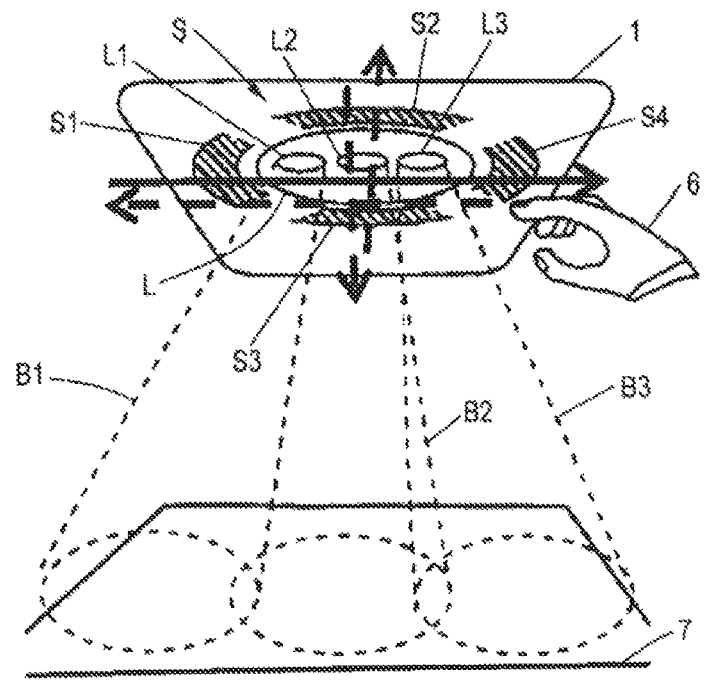
Figure 2B:
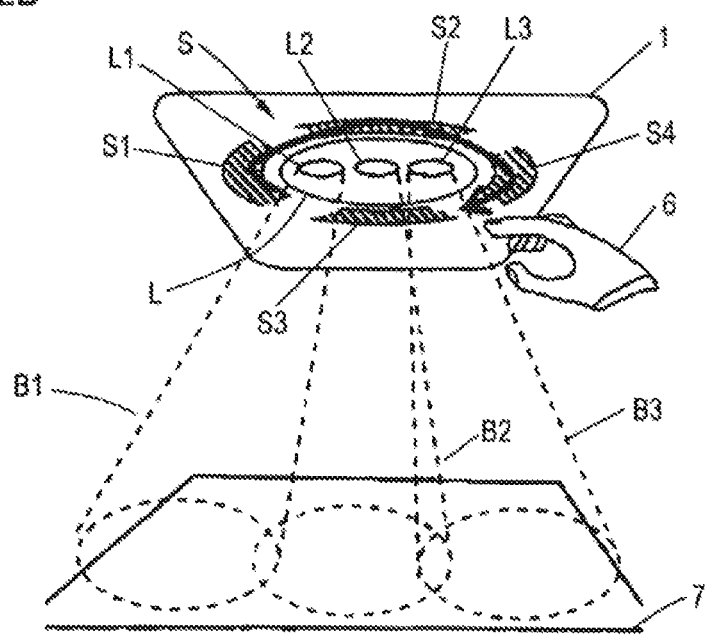
Figure 2C:
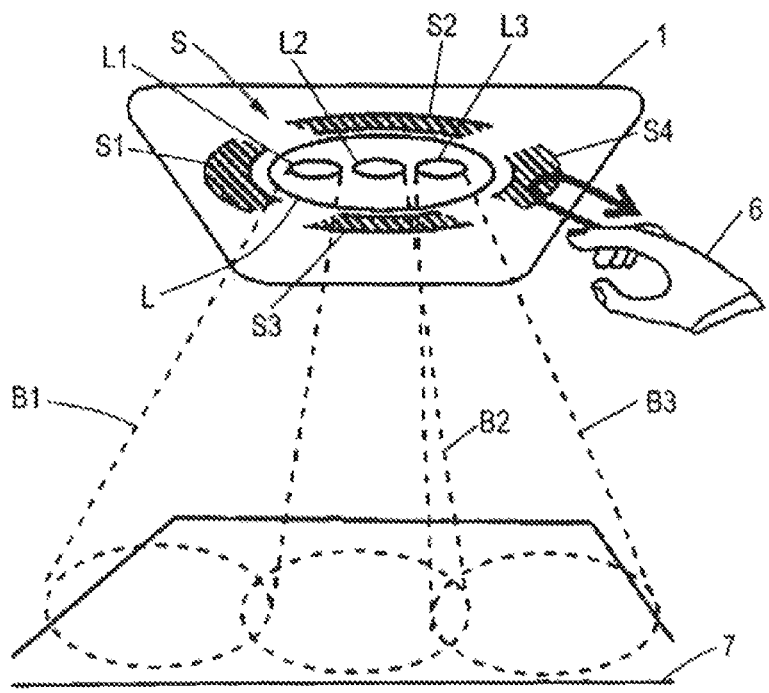

FIG. 2A to 2C are a perspective view of the interior lighting device 1 during different operator control situations in which an operator control object 6 in the form of a human finger is directed into and out of the sensing area and is moved therein. As can be seen, the lighting units L1 to L3 radiate light at an acute apex angle into different illumination areas B1 to B3, so that they produce a "spot" on a base 7.

A method according to the invention for operating the lighting device 1 that the control device 5 is designed to perform is explained below with reference to FIGS. 2A to 2C and 3A to 3C. In this case, FIG. 3A to 3C are each schematic representations that represent a position of the operator control object 6 over time, said position being detected by means of the sensor device S in the local sections O1 to O3 and processed by the control device 5, wherein the control device 5 actuates the lighting device L with a brightness time profile for its lighting units L1 to L3.

Figure 3A:
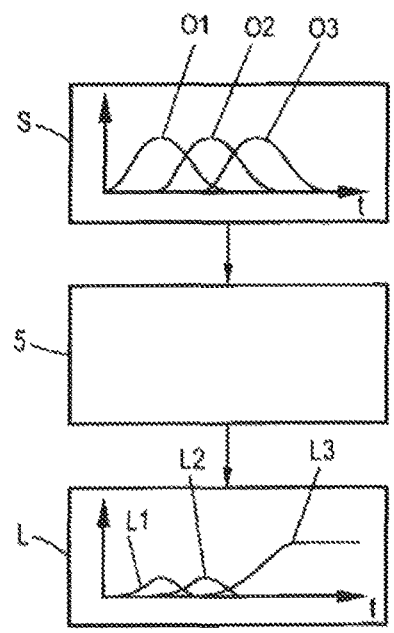

FIGS. 2A and 3A show an operator control situation during which the operator control object 6 performs a swipe gesture, said operator control object being directed horizontally over the sensor units S1, the lighting units L1 to L3 and the sensor unit S4. The solid arrow in this case shows the direction of movement implemented, with the dashed arrows symbolizing further conceivable operator control gestures. In this case, the operator control object 6, as shown in the top graph of FIG. 3A, initially enters the local section O1 and is sensed by the sensor S2. Through the further movement, the operator control object 6 subsequently arrives in the local section O2 and finally moves into the local section O3. As can be seen, the pieces of position information overlap as a result of the physical extent of the operator control object 6, even though the local sections O1 to O3 are defined disjunctly.

Over this path of movement, the control unit 5 initially actuates the lighting device L1 with a brightness profile that increases over time, and deactivates it again using a stipulated brightness profile at the moment at which the operator control object 6 is sensed in the local section O2. Similarly, the lighting unit L2 is deactivated when the operator control object 6 is sensed in the local section O3, with the lighting device L3 being activated at the same time. Since the operator control object 6 then leaves the sensing area E, hence is not detected in a further local section O3, the lighting device L3 remains in the activated state. The envisaged brightness profiles for activation and deactivation are defined in the present case as a brightness function with an S-shaped profile over time, which has an inflection point. The stipulation of the brightness time profile therefore allows the lighting unit L3 to be activated with a soft appearance, which, on the base 7 too, is similar to a Cardan interior lighting device being mechanically swiveled in the direction of the swipe gesture.

Figure 3B:
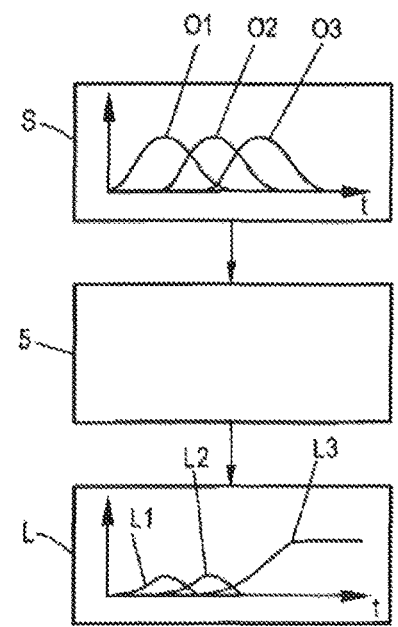
Figure 3C:
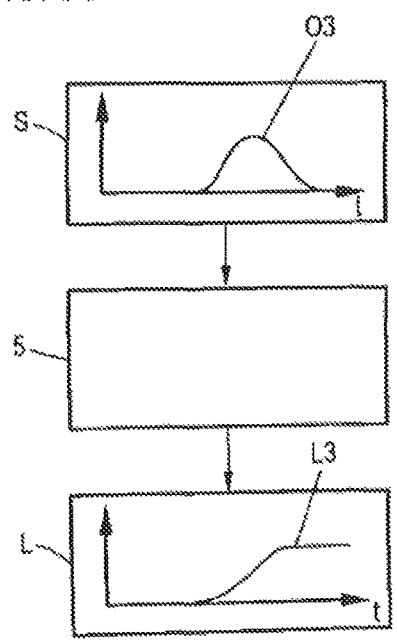

FIGS. 2B and 3B show the interior lighting device 1 during an operator control situation in which the operator control object 6 performs a sliding gesture around the lighting device L by sweeping from the sensor unit S1 to the sensor unit S4 in an arch. In this case, the operator control object 6 is sensed in the local sections O1 to O3 in succession. The resultant brightness profile is accordingly substantially identical to that of the swipe gesture described above.

FIGS. 2C and 3C show the interior lighting device in an operator control situation in which the operator control object performs a tapping gesture. To this end, the operator control object 6 enters the local section O3 and then leaves it again immediately afterwards. Since neither the lighting unit L1 nor the lighting unit L2 were activated beforehand, there is no deactivation by the control device 5, and the lighting unit L3 is activated in accordance with the stipulated brightness profile and remains in this state.

In an operator control situation, not shown, that corresponds to the one cited above but in which the lighting unit L1 was already switched on, the activation of the lighting unit L3 is initially preceded by deactivation of the lighting unit L1 and brief activation, with subsequent deactivation, of the lighting unit L2, so that such a tapping gesture effects a cross-fade from the lighting unit L1 through the lighting unit L2 to the lighting unit L3.

In a further operator control situation, not shown, that corresponds to the one in FIGS. 2B and 3B, but wherein the sliding gesture is directed further from the local section O3 to the local section O2, the control device 5 senses this as a position trace, after which it activates all lighting units L1, L2, L3 as a stipulated control action. Said lighting units are actuated not to their greatest possible actuatable brightness, however, but rather also to a low value of 60%. When this operator control gesture is repeated, the thus sensed position trace and the activated state of all lighting units L1 to L3 are taken as a basis for deactivating the latter completely.

During the operator control situations shown in FIGS. 2A to 2C and 3A to 3C, after the lighting unit L3 has been activated, the display element A4 is activated and hence indicates the current direction of lighting to the user.

Figure 4:
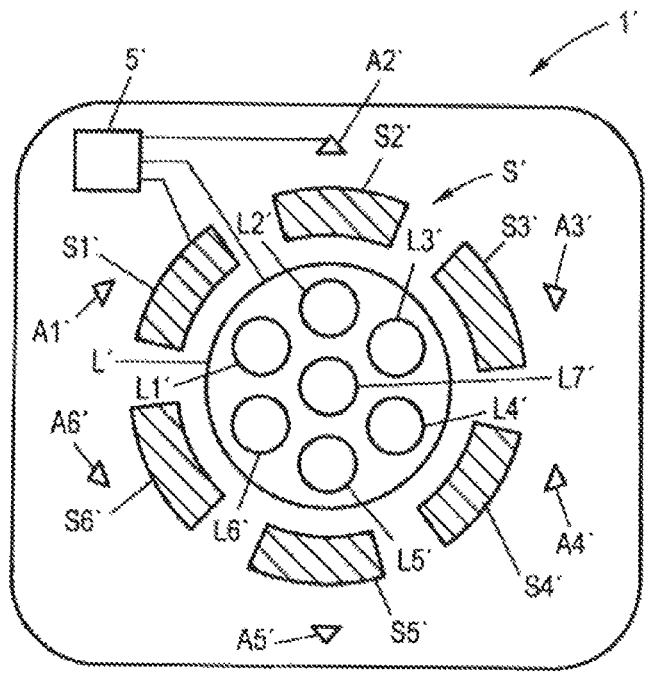
FIG. 4 shows a front view of a second exemplary embodiment of an interior lighting device according to the invention.
Figure 5:
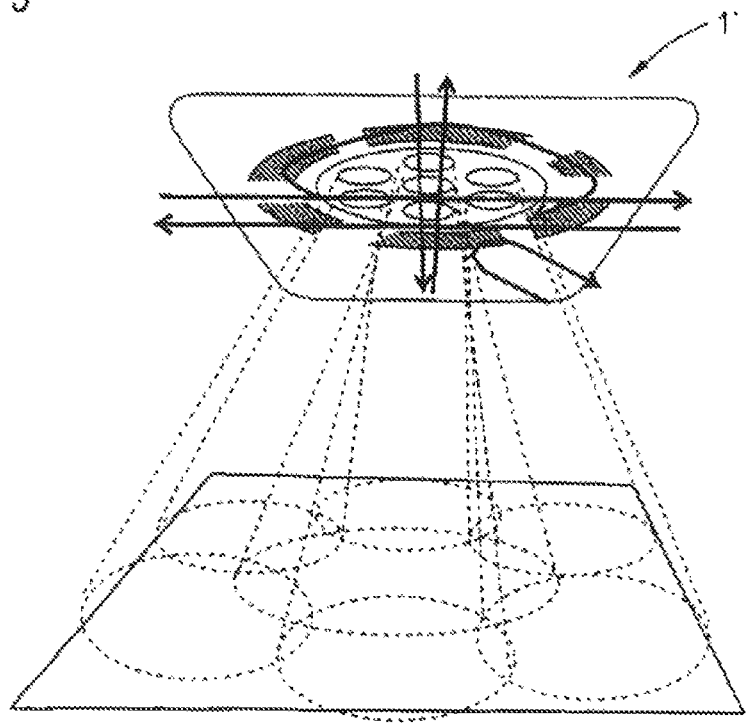
FIG. 5 shows a perspective view of the interior lighting device shown in FIG. 4.

FIGS. 4 and 5 show a second exemplary embodiment of an interior lighting device 1' that corresponds to the interior lighting device 1 described above but has seven lighting units L1' to L7' of a lighting device L'. In addition, a sensor device S' has six sensor units S1' to S6', with six display elements A1' to A6' and a control device 5' being provided.

FIG. 4 is a front view of the interior lighting device 1', which is operated analogously to the interior lighting device 1, a swipe gesture and a sliding gesture not producing an identical light profile in this case: on a swipe gesture from the sensor unit S1' to the sensor unit S4' through the lighting units L1', L7' and L4', the lighting units L1' and L7' are activated and deactivated in succession, after which the lighting unit L4' is and remains activated. On a sliding gesture from the sensor unit S1' to the sensor unit S4' through the sensor unit S2' and the sensor unit S3' in the form of an arch, on the other hand, the lighting devices L1', L2' and L3' are activated and deactivated in succession, after which the lighting unit L4' is activated and remains in this state. In this case, the operator-control-gesture-controlled lighting behavior of the interior lighting device 1' is even more strikingly similar to that of a mechanical Cardan interior lighting device.

FIG. 5 is a perspective view of the interior lighting device 1', with arrows depicting possible movement gestures.

Furthermore, further exemplary embodiments corresponding to the interior lighting device 1,1' are conceivable, for example with five quincuncially arranged lighting units and four sensor units or with nine lighting units arranged in a square 3×3 grid and eight sensor units.

Figure 6:
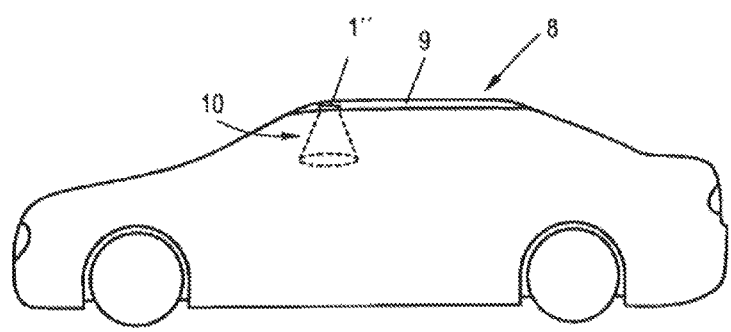
FIG. 6 shows a motor vehicle according to the invention.

FIG. 6 is a basic outline of an exemplary embodiment of a motor vehicle 8, comprising an interior lighting device 1" that is arranged in a roof lining 9 of the motor vehicle and illuminates a passenger compartment 10 of the motor vehicle 8.

The invention claimed is:

1. A method for operating an interior lighting device for a motor vehicle, the method comprising:
    providing a lighting device having a plurality of actuatable lighting units and a sensor device having a plurality of sensor units with overlapping sensing regions for sensing a position of an operator control object,
    dividing a sensing area of the sensor device into a plurality of non-overlapping local sections and associating at least one local section with each lighting unit,
    sensing the operator control object, determining the operator control object is within a first local section of the non-overlapping local sections, and, as a result, activating the lighting unit associated with the first local section and deactivating the lighting units not associated with the first local section.

2. The method according to claim 1, further comprising:
    sensing multiple positions of the operator control object in succession that form a position trace, comparing the position trace to a list of predefined position traces, and, if the position trace matches, activating or deactivating a plurality of the lighting units according to a stipulated control action associated with the position trace.

3. The method according to claim 2, wherein the stipulated control action activates all lighting units or deactivates all lighting units.

4. The method according to claim 1, wherein the lighting units are activated or deactivated in accordance with a predefined brightness time profile independent of the position or speed of the operator control object.

5. The method according to claim 1,
    wherein sensing the operator control object includes
        receiving sensor data from all of the plurality of sensor units in the interior lighting device to ascertain a piece of position information describing the position of the operator control object, wherein determining the operator control object is within a first local section of the non-overlapping local sections includes evaluating the piece of position information derived from all of the plurality of sensor units in the interior lighting device.

6. An interior lighting device for a motor vehicle comprising:
- a lighting device having a plurality of actuatable lighting units,
- a sensor device having multiple sensor units with overlapping sensing regions configured for sensing a position of an operator control object, wherein the sensor device has a sensing area comprising a plurality of non-overlapping local sections, and
- a control device configured for controlling the lighting device based on sensor data obtained from the sensor device,
- wherein each actuatable lighting unit is associated with one or more of the plurality of non-overlapping local sections, wherein the control device is configured to receive the sensor data, determine the operator control object is within a first local section of the non-overlapping local sections, and, as a result, activate the lighting unit associated with the first local section and deactivate the lighting units not associated with the first local section.

7. The interior lighting device according to claim 6, wherein the lighting units have different radiation angles or illumination areas.

8. The interior lighting device according to claim 6, wherein the sensor device is arranged physically adjacently to the lighting device.

9. The interior lighting device according to claim 6, wherein individual sensing areas of the sensor units form the sensing area.

10. The interior lighting device according to claim 9, wherein at least two lighting units and at least two sensor units are arranged in alignment.

11. The interior lighting device according to claim 9, wherein the multiple sensor units are arranged in a circular pattern surrounding the lighting device.

12. The interior lighting device according to claim 11, wherein there are a greater number of non-overlapping local sections than there are multiple sensor units.

13. The interior lighting device according to claim 11, wherein there are a lesser number of non-overlapping local sections than there are multiple sensor units.

14. The interior lighting device according to claim 6, further comprising at least one display element connected to the control device and associated with at least one lighting unit, wherein the at least one display element is configured to activate when the at least one lighting unit is activated.

15. A motor vehicle, comprising at least one interior lighting device according to claim 6.

16. The interior lighting device according to claim 6, wherein the control device is configured to receive sensor data from all of the multiple sensor units in the interior lighting device to ascertain a piece of position information describing the position of the operator control object, wherein the piece of position information is used to determine whether the operator control object is within a first local section of the non-overlapping local sections.

* * * * *